(12) United States Patent
Kim et al.

(10) Patent No.: US 12,278,069 B2
(45) Date of Patent: Apr. 15, 2025

(54) ELECTROMAGNETIC CONTACTOR FOR STAR-DELTA DRIVING

(71) Applicant: Tae Jung Kim, Incheon (KR)

(72) Inventors: Tae Jung Kim, Incheon (KR); Dong Hee Kim, Incheon (KR)

(73) Assignee: Tae Jung Kim, Incheon (KR)

( * ) Notice: Subject to any disclaimer, the term of this patent is extended or adjusted under 35 U.S.C. 154(b) by 274 days.

(21) Appl. No.: 17/915,791

(22) PCT Filed: Mar. 31, 2021

(86) PCT No.: PCT/KR2021/003988
§ 371 (c)(1),
(2) Date: Sep. 29, 2022

(87) PCT Pub. No.: WO2021/201590
PCT Pub. Date: Oct. 7, 2021

(65) Prior Publication Data
US 2023/0253171 A1 Aug. 10, 2023

(30) Foreign Application Priority Data
Apr. 1, 2020 (KR) .......... 10-2020-0039570

(51) Int. Cl.
*H01H 50/02* (2006.01)
*H01H 50/00* (2006.01)
(Continued)

(52) U.S. Cl.
CPC ........ *H01H 50/002* (2013.01); *H01H 50/443* (2013.01); *H01H 50/56* (2013.01); *H02P 1/32* (2013.01)

(58) Field of Classification Search
CPC .... H01H 50/002; H01H 50/443; H01H 50/56; H01H 51/005; H01H 51/065; H01H 50/14; H01H 50/546; H02P 1/32
(Continued)

(56) References Cited

U.S. PATENT DOCUMENTS 3,296,567 A * 1/1967 Conner ................. H01H 50/22
335/126
3,544,929 A * 12/1970 Kussy .................. H01H 50/22
335/126
(Continued)

FOREIGN PATENT DOCUMENTS

KR 10-2000-0073458 12/2000
KR 20-0224390 Y1 5/2001
(Continued)

*Primary Examiner* — Shawki S Ismail
*Assistant Examiner* — Lisa N Homza
(74) *Attorney, Agent, or Firm* — IP Legal Services, LLC

(57) ABSTRACT

The present invention relates to an electromagnetic contactor, and more particularly, to an electromagnetic contactor for star-delta driving, which is capable of rapidly and safely switching a connection of a 3-phase motor from a star connection to a delta connection and simplifying configurations of a connection circuit and an opening/closing device. According to the electromagnetic contactor for star-delta driving and a control device thereof of the present invention, the connection of the 3-phase motor can be switched rapidly and safely from the star connection to the delta connection, and the configuration of the connection circuit and a control circuit of a power supply thereof and a magnetic switch configuration can be simplified, and thus, there is an effect of saving space by reducing the size and weight of a product and reducing the numbers of power wirings and control circuit wirings. In addition, a magnetic switch between star and delta connections is interlocked by using a timer and an auxiliary contact, so as to improve the
(Continued)

convenience of an operator and reduce construction time. In addition, because a timer base and the control device are ready-made in the form of manufactured goods, it is easy to use the products and there is very little risk of causing a misconnection in the control device. Thus, there are effects of improving the safety of a construction operator at a construction site and a general user, and improving driving components and circuit protection.

6 Claims, 6 Drawing Sheets

(51) Int. Cl.
  *H01H 50/44* (2006.01)
  *H01H 50/56* (2006.01)
  *H02P 1/32* (2006.01)
(58) Field of Classification Search
  USPC .............................................. 335/2
  See application file for complete search history.

(56) References Cited

U.S. PATENT DOCUMENTS

| | | |
|---|---|---|
| 6,304,049 B1 | 10/2001 | Fournier et al. |
| 6,472,837 B1 | 10/2002 | Caporalin et al. |
| 6,628,184 B1 * | 9/2003 | Cassagrande ........ H03K 5/1254 |
| | | 335/190 |
| 6,794,967 B1 | 9/2004 | Park |
| 8,159,321 B2 * | 4/2012 | Bollinger ............. H01H 50/546 |
| | | 335/106 |

FOREIGN PATENT DOCUMENTS

| | | |
|---|---|---|
| KR | 10-2001-0108365 | 12/2001 |
| KR | 20-0308097 Y1 | 3/2003 |
| KR | 10-2004-0098810 | 11/2004 |
| KR | 10-2009-0004002 A | 1/2009 |

* cited by examiner

ELECTROMAGNETIC CONTACTOR FOR STAR-DELTA DRIVING

CROSS REFERENCE TO RELATED APPLICATIONS

This application is a National Stage Patent Application of PCT International Patent Application No. PCT/KR2021/003988 (filed on Mar. 31, 2021) under 35 U.S.C. § 371, which claims priority to Korean Patent Application No. 10-2020-0039570 (filed on Apr. 1, 2020), the teachings of which are incorporated herein in their entireties by reference.

TECHNICAL FIELD

The present invention relates to an electromagnetic contactor, and more particularly, to an electromagnetic contactor for star-delta driving, which is capable of rapidly and safely switching a connection of a 3-phase motor from a star connection to a delta connection and simplifying configurations of a connection circuit and an opening/closing device.

BACKGROUND ART

In an original motor starting method, in case of small capacity, a direct-on-line starting method of starting a motor by directly supplying power to the motor is used, and in the case of large capacity, a star (Y) delta (Δ) starting method is used because a load is usually large when 7.5 Kw or more. Since this method is large capacity and thus the load is large, the motor is driven by a star connection, and when a rotational acceleration is increased to a certain extent, the connection is changed to a delta connection to operate normally.

However, this method requires three magnetic switches, that is, a main magnetic switch, a star magnetic switch, and a delta magnetic switch. In addition, this method is used with complicated connection such as an interlock connection between an operation box, which is capable of operating a timer, a push button switch, and a magnetic switch, and two star/delta magnet switches.

In general, the switching of the star (Y)-delta (Δ) connection in the motor is used to improve power operation efficiency and avoid an overload condition at the time of starting and normal operation of the motor. In practice, the star connection of the motor can lower a starting current (⅓) and a starting torque at the time of starting. During normal operation after starting, by switching the motor wiring method to delta connection, it is possible to operate under full load and protect peripheral devices and motors from overload.

A device for starting a motor through such star-delta switching may be roughly divided into a method using a magnetic switch that changes an electrical contact by using a magnet, and a method such as a non-contact device and PLC.

As a known technology, as shown in FIG. 1, Korean Patent Publication No. 2001-0108365 (hereinafter referred to as 'prior art 1') proposes a technical configuration which includes first to third power terminals 121 to which 3-phase power lines are connected, first to third main starting terminals 122 to which terminals of the 3-phase motor are connected, first to third star-delta terminals 123 to which the other terminals of the 3-phase motor are connected, a main circuit electromagnet 130 and a star-delta connection electromagnet 140 installed inside a main body 110, a main circuit opening/closing unit 150 for selectively separating or connecting the first to third power terminals 121 and the first to third main starting terminals 122 according to the magnetization of the main circuit electromagnet 130, and a star-delta connection switching unit for selectively connecting the first to third star-delta terminals 123 to each other or selectively connecting the first to third main starting terminals 122 and the first to third star-delta terminals 123 to each other.

In addition, as shown in FIG. 2, Korean Patent Publication No. 10-2004-0098810 (hereinafter referred to as 'prior art 2') proposes a technology in which a primary side coil and a secondary side coil of a transformer for power conversion (indicated by reference number 400) are formed around a main circuit electromagnet (indicated by reference number 230), thereby reducing the volume of the product by minimizing the space generated by the formation of the transformer coil.

However, when coils 132 and 232 for operating the electromagnetic contactor are excited and the contact of the main starting electromagnetic contactor is closed, main starting power supplies 121a, 121b, 121c, 221a, 221b, and 221c of prior art 1 supply power main power supplies U1/V1/W1 through main power supplies 122a to 122c and 263a to 263c through the main starting electromagnetic contactor.

At this time, the main power supplies 122a to 122c and 263a to 263c that use the terminals common to the U1/V1/W1 terminals supply power for delta operation. Therefore, when a coil 142 is excited and contacts of the electromagnetic contactor for delta operation are closed, coil power of the electromagnetic contactor for star-delta operation is excited through the contacts 163a to 163c and 223a to 233c of the electromagnetic contactor for delta operation and an elevating member moves downward. The secondary side of the electromagnetic contactor for the main starting power is short-circuited with the primary side of the electromagnetic contactor for star-delta operation. As a result, a current flowing in the main electromagnetic contactor that connects/disconnects the main driving power supply is the result of adding the current of the electromagnetic contactor for main starting power and the electromagnetic contactor for star-delta operation. In addition, the electromagnetic contactor for the main starting power must select an electromagnetic contactor suitable for the magnitude of the added flowing current. For the current during the star-delta starting operation, 57.7% of the current during the direct-on-line operation flows through each electromagnetic contactor. Therefore, the size and capacity of the electromagnetic contactor during the normal star-delta starting operation may be reduced accordingly.

However, the electromagnetic contactor for the main starting power in prior art 1 and prior art 2 must use a relatively large capacity product compared with the existing electromagnetic contactor for the main starting power used in the existing star-delta starting operation method. Furthermore, since the connection of the star starting method in prior art 1 and prior art 2 is a method of using a separate elastic member instead of using the existing electromagnetic contactor for star starting, there is a problem in that a relatively large elastic force must be secured for handling the starting current.

That is, in order to maintain the closed state of the contact of the electromagnetic contactor for the delta operation as the timer is switched to the delta operation and the electromagnet for the delta operation is excited. the elastic force of the elastic member used during the star starting operation continues to act during the delta operation. Therefore, there is a need for a large capacity electromagnet device capable of maintaining the contact force during the delta operation even if the capacity of the electromagnet for the delta operation offsets the elastic force of the elastic member used during the star starting operation.

In addition, when a rectifier is used so as to use a DC power for a large capacity electromagnet, there is a problem in that the size of the product and the number of parts increase accordingly.

The above-described star-delta starting device including one unit according to the prior art has four major problems in use.

First, as wires having considerable thicknesses are fastened to the first to third main starting terminals 122*a*, 122*b*, and 122*c* in the connection process, the corresponding wires are located on the upper side of the star-delta connection switching part 160. Therefore, it is difficult to visually confirm whether the elevating member 162 for star-delta connection operates.

That is, in the above-described type of connection, as the wire connected to the motor side passes while covering a press faucet located on an upper portion of a Δ magnet. Therefore, when a lid needs to be opened due to the inspection of the magnet, it is necessary to unscrew the wire connected so that a current flows. In addition, a magnetic field may be generated in a motor-side line passing over the Δ magnet, and it is difficult to operate due to the exposure of the line.

Second, due to the wires fastened to the first to third main starting terminals 122*a*, 122*b*, and 122*c*, it is difficult to perform an operation of fastening or detaching wires to or from the first to third star/delta terminals 123*a*, 123*b*, and 123*c*. This is emerging as a very big problem. For example, the work time for system maintenance is increased and unnecessary double work is performed.

Third, in the prior art, a part of a screw coupling part for fastening the lower portion and the upper portion is located in the lower portion of the first to third power terminals 121*a*, 121*b*, and 121*c* and the first to third star-delta terminals 123*a*, 123*b*, and 123*c*. Therefore, when the lid needs to be opened for checking the magnet in the maintenance step after the wiring work for system implementation is completed, there occur problems. For example, dismantling the wiring line has to be preceded.

Fourth, in the prior art, since a timer knob for timer control is located under the wiring line, the work according to the timer control is not easy.

DESCRIPTION OF EMBODIMENTS

Technical Problem

The present invention has been made in an effort to solve the above problems, and an object of the present invention is to provide an electromagnetic contactor for star-delta driving, which is capable of rapidly and safely switching a connection of a 3-phase motor from a star connection to a delta connection and simplifying configurations of a connection circuit and an opening/closing device.

In addition, another object of the present invention is to provide an electromagnetic contactor for star-delta driving, which can reduce the number of terminals of the electromagnetic contactor, can reduce the number of wires in power supply, can reduce design and work time, can reduce the cost of raw and subsidiary materials through material cost reduction, thereby securing cost-effectiveness through price competitiveness, can achieve miniaturization, and can significantly improve work efficiency and reduce costs in a method of remarkably reducing the possibility of misconnection by previously installing an interlock circuit at a production plant.

Solution to Problem

An electromagnetic contactor for star-delta driving according to the present invention includes a magnetic contactor main (MCM) for opening/closing a main circuit and a magnetic contactor delta (MCD) for a delta connection driving, which respectively include: crossbars installed in an inner space formed by an upper frame and a lower frame; movable cores connected to lower portions of the crossbars; fixed cores spaced apart at a predetermined distance below the movable cores; and working coils installed in the fixed cores, and back springs installed inside the movable cores, wherein movable contacts are installed on upper portions of the crossbars so as to be in electrical contact with fixed contacts, the MCM is provided with first starting terminals electrically connected to one terminals (U/V/W) of a motor and first connection terminals electrically connected to the MCD, the MCD is provided with second connection terminal electrically connected to the MCM and second starting terminals electrically connected to the other terminals (X/Y/Z) of the motor and a magnetic contactor Y (MCY) for starting Y connection, the first connection terminals of the MCM and the second connection terminals of the MCD form a common contact connected to a power supply line of a main power supply.

Advantageous Effects of Disclosure

According to the electromagnetic contactor for star-delta driving and a control device thereof of the present invention, the connection of the 3-phase motor can be switched rapidly and safely from the star connection to the delta connection, and the configuration of the connection circuit and a control circuit of a power supply thereof and a magnetic switch configuration can be simplified, and thus, there is an effect of saving space by reducing the size and weight of a product and reducing the numbers of power wirings and control circuit wirings.

In addition, a magnetic switch between star and delta connections is interlocked by using a timer and an auxiliary contact, so as to improve the convenience of an operator and reduce construction time.

In addition, because a timer base and the control device are ready-made in the form of manufactured goods, it is easy to use the products and there is very little risk of causing a misconnection in the control device. Thus, there are effects of improving the safety of a construction operator at a construction site and a general user, and improving driving components and circuit protection.

BEST MODE

Preferred embodiments of the present invention will be described in detail with reference to the accompanying drawings.

Figure 1:
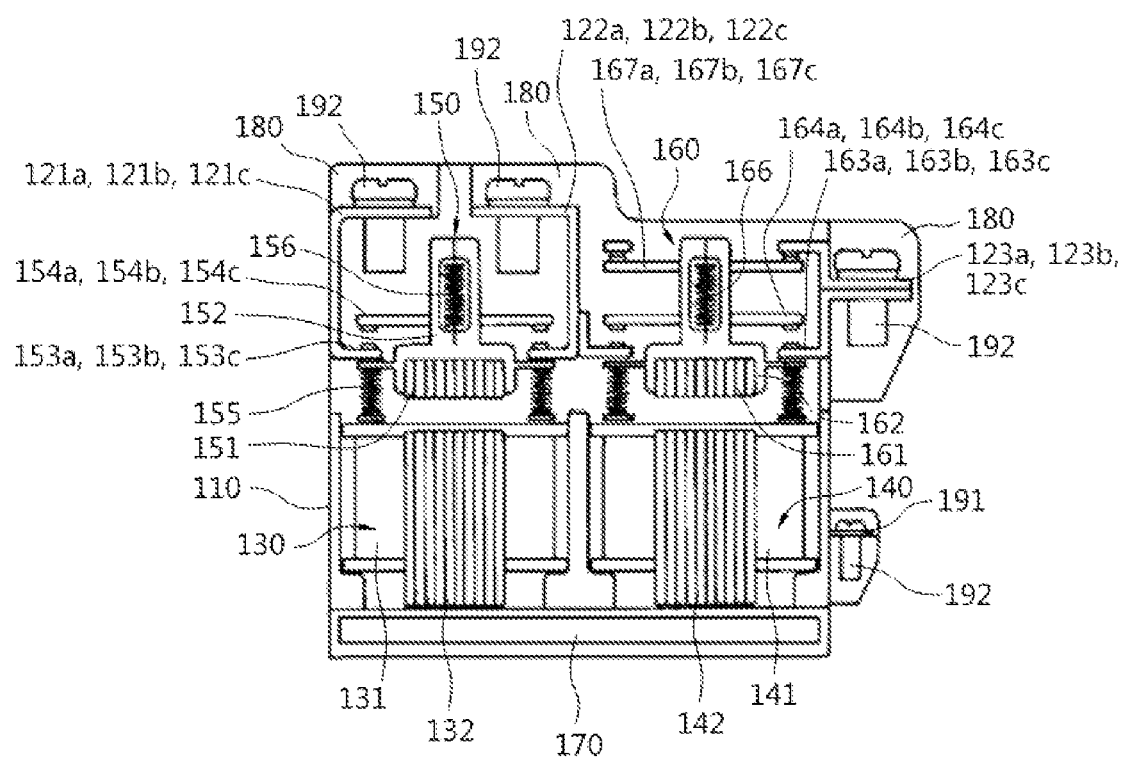
FIG. 1 is a cross-sectional view of a conventional electromagnetic switch.
Figure 2:
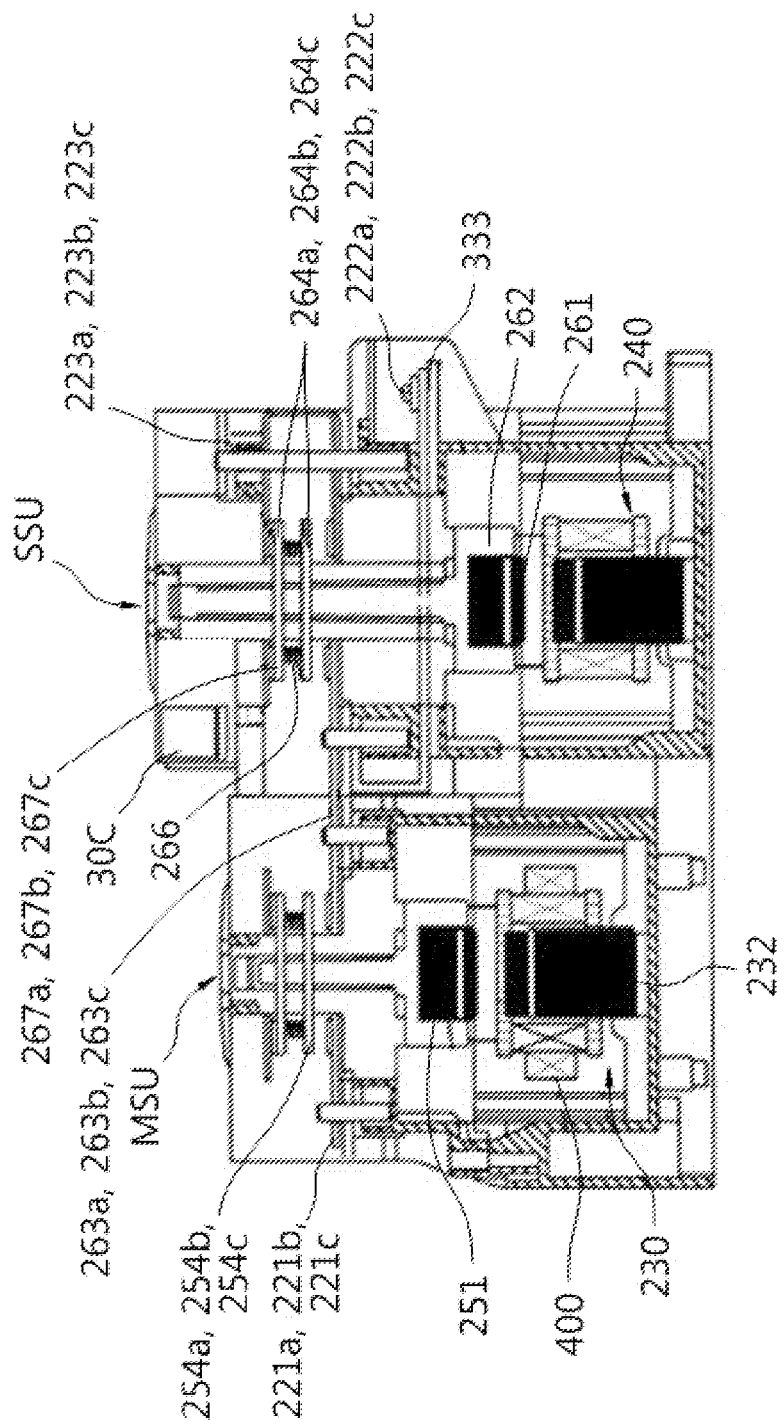
FIG. 2 is a cross-sectional view of another conventional electronic switch.
Figure 3:
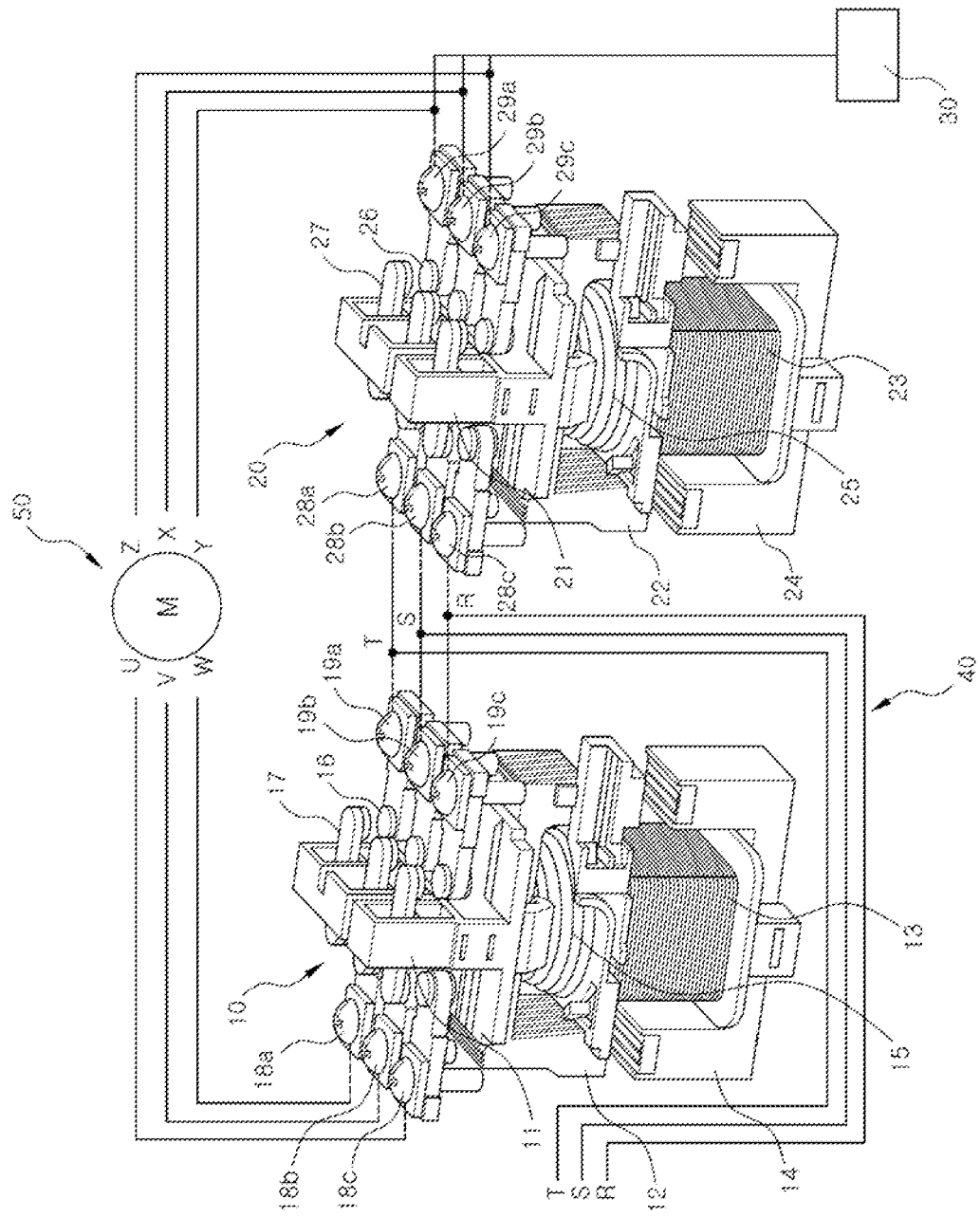
FIG. 3 is a schematic diagram of an electromagnetic contactor for star-delta driving according to the present invention.

As shown in FIG. 3, a magnetic contactor main (MCM) 10 and a magnetic contactor delta (MCD) 20, which form a bilaterally symmetrical structure, are connect by insulating conductive plates 40 for R, S, and T supply to form a common contact. (In FIG. 3, an upper frame and a lower frame that maintain the overall shape are detached in order to show the internal structure.) In this case, a separate reference numeral is not assigned to power terminals to which 3-phase power is connected.

That is, the MCM 10 for opening/closing the main circuit and the MCD 20 for the delta connection driving respectively include crossbars 11 and 21 installed in an inner space formed by an upper frame and a lower frame, movable cores 12 and 22 connected to the lower portions of the crossbars 11 and 21, fixed cores 14 and 24 spaced apart at a predetermined distance below the movable cores 12 and 22, working coils 13 and 23 installed in the fixed cores 14 and 24, and back springs 15 installed inside the movable cores 12 and 22, wherein movable contacts 17 and 27 are installed on the upper portions of the crossbars 11 and 21 so as to be in electrical contact with fixed contacts 16 and 26.

In addition, the MCM 10 is provided with first starting terminals 18a, 18b, and 18c electrically connected to one terminals U/V/W of a motor 50 and first connection terminals 19a, 19b, and 19c electrically connected to the MCD 20. The MCD 20 is provided with second connection terminal 28a, 28b, and 28c electrically connected to the MCM 10 and second starting terminals 29a, 29b, and 29c electrically connected to the other terminals X/Y/Z of the motor 50 and a magnetic contactor Y (MCY) 30 for starting Y connection. The first connection terminals 19a, 19b, and 19c of the MCM 10 and the second connection terminals 28a, 28b, and 28c of the MCD 20 form a common contact connected to the power supply line of a main power supply 100.

At this time, the other terminals X/Y/Z of the motor 50 is connected to each terminal of the MCY 30 for starting Y connection as a common contact.

For reference, the first starting terminals include a first starting terminal 1 18a, a first starting terminal 2 18b, and a first starting terminal 3 18c to be described below, the second starting terminals include a second starting terminal 1 29a, a second starting terminal 2 29b, and a second starting terminal 3 29c to be described below, the first connection terminals include a first connection terminal 1 19a, a first connection terminal 2 19b, and a first connection terminal 3 19c to be described below, and the second connection terminals include a second connection terminal 1 28a, a second connection terminal 2 28b, and a second connection terminal 3 28c to be described below.

Therefore, when power is applied to the MCM 10, the back spring 15 is compressed while the movable core 12 comes into contact with the fixed core 14 by the suction force generated from the working coil 13. At this time, as the crossbar 11 connected to the movable core 12 moves downward together, the movable contact 17 comes into contact with the fixed contact 16.

In contrast, when the power is cut off, the suction force of the working coil 13 disappears and the back spring 15 expands, and thus the movable core 12 moves upward. Therefore, the movable contact 17 is separated from the fixed contact 16.

In particular, there is the technical feature of the present invention in that the power supply line of the main power supply 100 connected to the MCM 10 and the MCD 20 is provided with three busbar-type insulating conductive plates 40 for R/S/T power supply.

Figure 4:
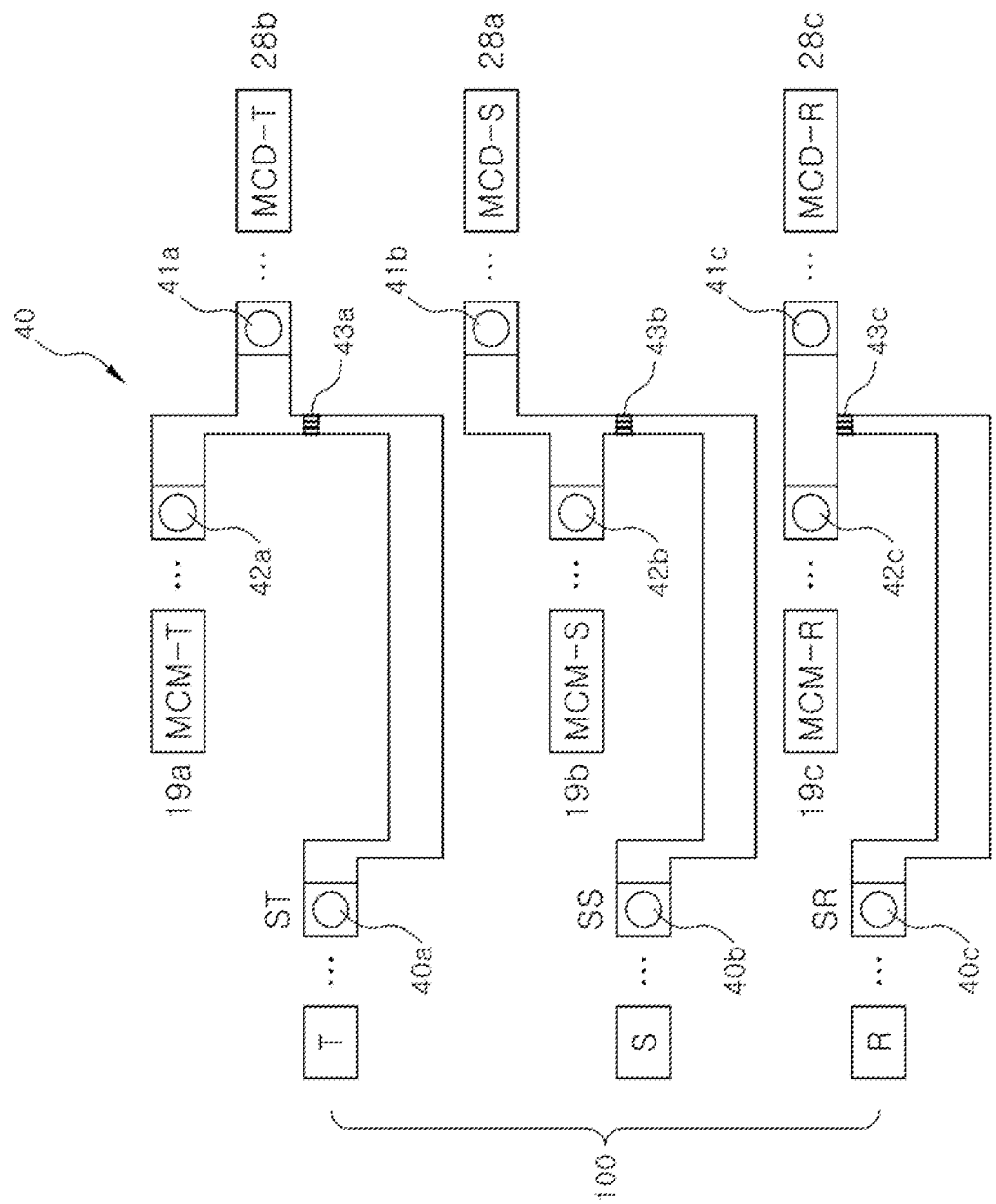
FIG. 4 is a pattern diagram schematically showing an insulating conductive plate according to the present invention.

As shown in FIG. 4, the insulating conductive plates 40 include: an ST terminal 40a connected to 'T' of the main power supply 100, a first terminal 41a connected to the MCD 20, and a second terminal 42a connected to the MCM 10; an SS terminal 40b connected to 'S' of the main power supply 100, a first terminal 41b connected to the MCD 20, and a second terminal 42b connected to the MCM 10; and an SR terminal 40c connected to 'R' of the main power supply 100, a first terminal 41c connected to the MCD 20, and a second terminal 42c connected to the MCM 10.

Therefore, the ST 40a of the insulating conductive plate 40 electrically connects the first connection terminal 1 19a of the MCM 10 and the second connection terminal 2 28b of the MCD 20, the SS 40b of the insulating conductive plate 40 electrically connects the first connection terminal 2 19b of the MCM 10 and the second connection terminal 1 28a of the MCD 20, and the SR 40c of the insulating conductive plate 40 electrically connects the first connection terminal 3 19c of the MCM 10 and the second connection terminal 3 28c of the MCD 20.

In particular, the insulating conductive plate 40 is provided with bent portions 43a, 43b, and 43c so as to be bent at the predetermined angle at the connection portion of the first connection terminals 19a, 19b, and 19c and the second connection terminal 1 28a, 28b, and 28c.

Figure 5:
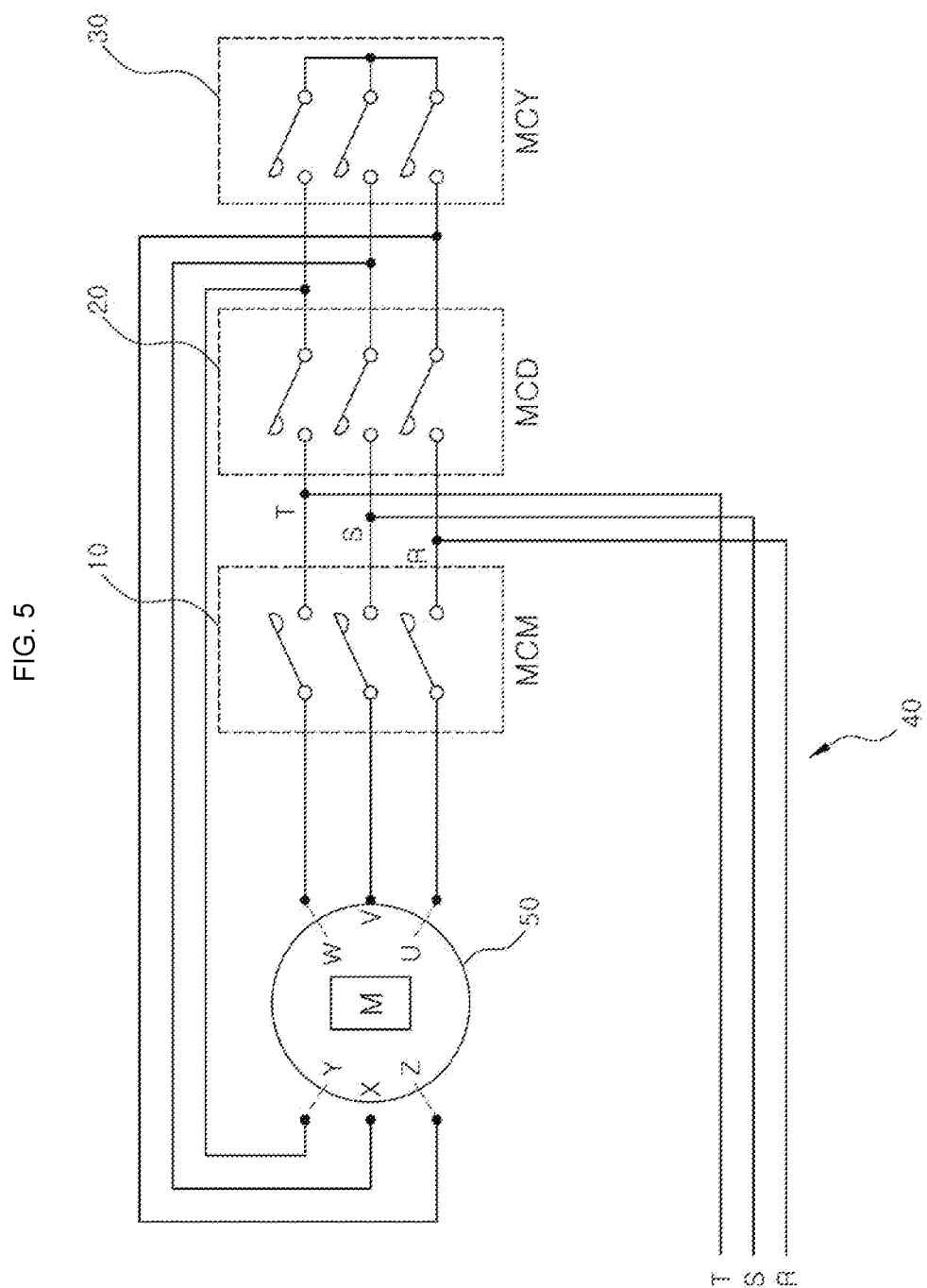
FIG. 5 is a circuit diagram of the electromagnetic contactor for star-delta driving according to the present invention.
Figure 6:
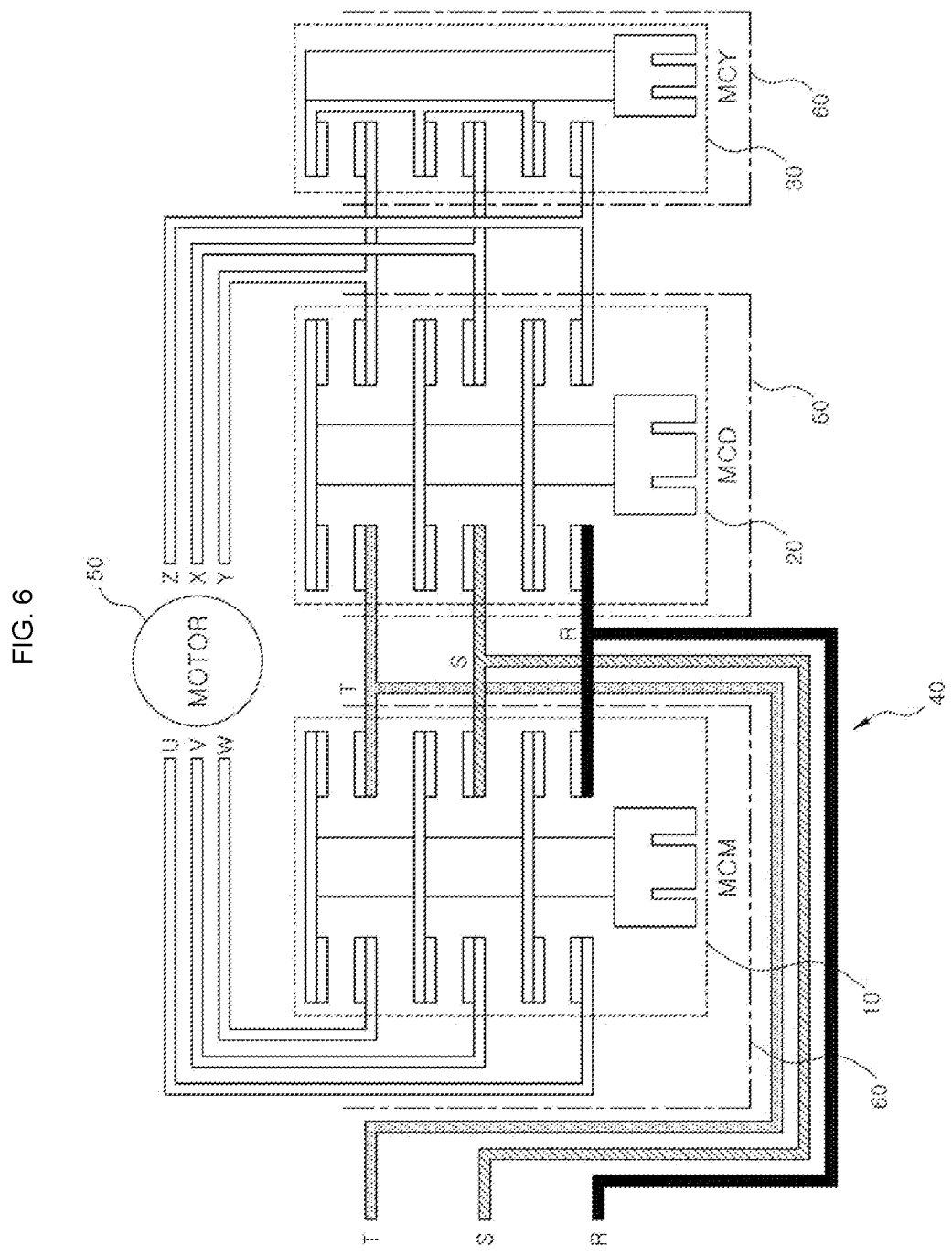
FIG. 6 is a pattern diagram of the electromagnetic contactor for star-delta driving according to the present invention.

As shown in the equivalent circuit diagram of FIG. 5, the electromagnetic switch for star-delta connection configured as above according to the present invention is operated in a connected state, performs star connection when starting the 3-phase motor M, and starts by reducing the starting current and torque by ⅓. After the start is completed, the electromagnetic switch is operated by switching to the delta connection.

On the other hand, the power supply of the electromagnetic contactor for star-delta driving is preferably installed through the lower end of the electromagnetic contactor when using a common power supply using the insulating conductive plates 40 and other power supply lines. When the working coils 13 and 23 installed under the inside of the electromagnetic contactor is excited, the distance between the coil and the power supply line of the main power supply 100 is inevitably narrowed. Therefore, electromagnetic induction between the respective power supplies may cause problems.

In the present invention, to prevent this problem, as shown in the pattern diagram of FIG. 3, an electromagnetic shielding plate 60 is preferably installed between the working coils 13 and 23 provided in the MCM 10, the MCD 20, and MCY 30 so as to prevent the electromagnetic induction phenomenon from occurring.

At this time, in one embodiment of the present invention, the electromagnetic shielding plate 60 is provided with a plate made of a lead material. In addition, the electromagnetic shielding plate 60 may use alternatives or other members capable of shielding electrons and magnetism. A lead plate is installed between the lower end of the electromagnetic contactor and the working coils 13 and 23 based on the direction in which the main power supply passes. The electromagnetic shielding plate 60 may also be installed on the side of the power supplied during star startup and the electromagnet excited during delta operation.

The present invention provides a dedicated electromagnetic switch designed to be suitable for a star-delta starting device for starting a 3-phase motor and operating the 3-phase motor at full speed within a short time. The connection structure by the busbar 40 is adopted, and the locations of the wiring terminals are changed to provide ease of the connecting work. Installers and operators easily perform control and maintenance for the operation of the star-delta starting device.

Therefore, instead of three magnet switches that are the existing connection method, powers R, S, and T of the electromagnetic contactor for main power supply and the electromagnetic contactor for delta driving are commonly supplied to the lower end of the electromagnetic contactor through the busbar-type insulating conductive plate 40, and they are combined into one. Therefore, it is easy to attach and detach a magnet switch, the number of terminals for power lines is reduced, and the number of power lines is reduced. Because the interlock connection between the timer and the two star (Y) and delta (Δ) magnet switches can be supplied as ready-made in the product state. When the product of the present invention is used, it is possible to save magnetic switches and wires and reduce a size of a distribution box. Therefore, there is an advantage of significantly reducing material and labor costs.

DESCRIPTION OF SYMBOLS

10: Magnetic Contactor Main (MCM) 20: Magnetic Contactor Delta (MCD)
11, 21: crossbar 12, 22: movable core
13, 23: working coil 14, 24: fixed core
15, 25: back spring 16, 26: fixed contact
17, 27: movable contact 18a, 18b, 18c: first starting terminal
19a,19b,19c: first connection terminal 28a, 28b, 28c: second connection terminal
29a, 29b, 29c: second starting terminal
30: Magnetic Contactor Y (MCY) 40: insulating conductive plate
40a: ST terminal 40b: SS terminal
40c: SR terminal 41a, 41b, 42c: first terminal
42a, 42b, 42c: second terminal 43a, 43b, 43c: bent portion
50: motor 60: electromagnetic shielding plate

The invention claimed is:

1. An electromagnetic contactor for star-delta driving comprising a magnetic contactor main (MCM) for opening/closing a main circuit and a magnetic contactor delta (MCD) for a delta connection driving, which respectively include:
   crossbars installed in an inner space formed by an upper frame and a lower frame;
   movable cores connected to lower portions of the crossbars;
   fixed cores spaced apart at a predetermined distance below the movable cores; and
   working coils installed in the fixed cores, and back springs installed inside the movable cores,
   wherein movable contacts are installed on upper portions of the crossbars so as to be in electrical contact with fixed contacts,
   the MCM is provided with first starting terminals electrically connected to one terminals (U/V/W) of a motor and first connection terminals electrically connected to the MCD,
   the MCD is provided with second connection terminal electrically connected to the MCM and second starting terminals electrically connected to the other terminals (X/Y/Z) of the motor and a magnetic contactor Y (MCY) for starting Y connection,
   the first connection terminals of the MCM and the second connection terminals of the MCD form a common contact connected to a power supply line of a main power supply.

2. The electromagnetic contactor of claim 1, wherein the power supply line of the main power supply connected to the MCM and the MCD is provided with three busbar-type insulating conductive plates for R/S/T power supply.

3. The electromagnetic contactor of claim 2, wherein the insulating conductive plates include:
   an ST terminal connected to 'T' of the main power supply, a first terminal connected to the MCD, and a second terminal connected to the MCM;
   an SS terminal connected to 'S' of the main power supply, a first terminal connected to the MCD, and a second terminal connected to the MCM; and
   an SR terminal connected to 'R' of the main power supply, a first terminal connected to the MCD, and a second terminal connected to the MCM.

4. The electromagnetic contactor of claim 1, wherein the other terminals (X/Y/Z) of the motor is connected to each terminal of the MCY for starting Y connection as a common contact.

5. The electromagnetic contactor of claim 4, wherein the electromagnetic shielding plate is provided with a plate made of a lead material.

6. The electromagnetic contactor of claim 1, wherein an electromagnetic shielding plate is installed between the working coils provided in the MCM, the MCD, and MCY so as to prevent an electromagnetic induction phenomenon from occurring.

* * * * *